United States Patent [19]
Heath

[11] Patent Number: 4,896,784
[45] Date of Patent: Jan. 30, 1990

[54] FITTING FOR INTERCONNECTING NON-METALLIC CONDUIT

[75] Inventor: Kenneth A. Heath, Manchester, Mo.

[73] Assignee: Hubbell Incorporated, Orange, Conn.

[21] Appl. No.: 352,945

[22] Filed: May 17, 1989

[51] Int. Cl.$^4$ .............................................. H02G 3/08
[52] U.S. Cl. ...................................... 220/3.2; 220/3.8; 220/3.94; 174/53; 174/65 R
[58] Field of Search ................. 220/3.2, 3.8, 3.9, 3.94, 220/306, 323; 174/48, 53, 58, 65 R, 66

[56] References Cited

U.S. PATENT DOCUMENTS

| | | | |
|---|---|---|---|
| 413,133 | 10/1889 | Denison | 220/3.94 |
| 1,220,168 | 3/1917 | Baker | 220/3.8 |
| 1,424,443 | 8/1922 | Bissell | 220/3.94 |
| 1,914,011 | 6/1933 | Eccles . | |
| 2,272,178 | 2/1942 | McDowell et al. . | |
| 3,139,480 | 6/1964 | Desloge | 174/65 R |
| 3,430,799 | 3/1969 | Maier | 220/3.94 |
| 3,910,448 | 10/1975 | Evans et al. | 220/3.8 |
| 4,073,514 | 2/1978 | Pate | 285/127 |
| 4,076,364 | 2/1978 | Kuo | 174/65 R |
| 4,099,646 | 7/1978 | Devendorf | 220/3.8 |
| 4,212,415 | 7/1980 | Neely | 222/231 |
| 4,247,738 | 1/1981 | Bonato | 174/53 |
| 4,620,061 | 10/1986 | Appleton | 220/3.8 |
| 4,654,470 | 3/1987 | Feldman et al. | 174/65 R |

FOREIGN PATENT DOCUMENTS

| | | |
|---|---|---|
| 3403774 | 2/1985 | Fed. Rep. of Germany . |
| 88455 | 3/1921 | Switzerland ......................... 220/3.8 |

Primary Examiner—David T. Fidei
Attorney, Agent, or Firm—Jerry M. Presson; Walter C. Farley

[57] ABSTRACT

A wiring housing includes a main portion forming a box and a cover for the box. The main portion has a side wall and a back wall and tubular projections extending from the side and back walls to form conduits sockets to receive the ends of rigid or flexible PVC conduit. The cover has latches and the box has latch sockets to form a three-point snap connection between the components. Openings into the box from the tubular projections form stop shoulders to limit the insertion depth of the conduit. An open side of the box has outwardly sloping textured wall surfaces and the cover has a U-shaped channel fitting over the surfaces which, in assembly, form a water-excludiing closure assembly. The housing assembly is particularly effective for wire interconnections at the junctions of conduit runs.

12 Claims, 7 Drawing Sheets

FITTING FOR INTERCONNECTING NON-METALLIC CONDUIT

This invention relates to a fitting for interconnecting electrical conduit, particularly rigid PVC conduit, and for containing interconnections between the wires carried by the conduit.

BACKGROUND OF THE INVENTION

When an electrician is installing a wiring arrangement which uses polyvinyl chloride (PVC) conduit, either rigid or flexible, but particularly rigid, it is necessary to make interconnections between lengths of conduit. With rigid conduit, this need arises when sections of conduit intersect at a T-junction, a L-junction, or simply when it is necessary to join two coaxially aligned lengths of conduit for creating a long, straight conduit run.

At any such intersection, it is desirable to have access to the wires which are passing through the conduit and, in many cases, it is necessary to make electrical connections between the wires in the conduits.

While electrical boxes designed for holding switches, receptacles and the like can be used with conduit as junction boxes, they are not particularly well adapted for creating T or L-junctions and they are somewhat more complicated and expensive than necessary for simple conduit interconnection. Additionally, it would be necessary to supply a special cover requiring threaded fasteners in order to close an electrical box in circumstances where no device is mounted therein.

SUMMARY OF THE INVENTION

Accordingly, an object of the invention is to provide a fitting for interconnecting PVC conduit, particularly rigid conduit, which has a particularly advantageous size and shape for forming the necessary connections therein.

A further object is to provide such a fitting which is easily connectable to the conduit and which has improved access to the wires.

Yet another object is to provide such a fitting which has a snap-on cover which is easily removable with a simple hand tool.

A still further object is to provide such a fitting which employs a gasketless, rain-tight seal with surfaces formed to reject water tending to enter so that the fitting can be used in exterior as well as interior locations.

Briefly described, the invention comprises a wiring housing for interconnecting PVC conduit comprising the combination of a main portion including a back wall and a substantially continuous side wall forming a box with one open side, the side wall having a front edge lying in a single plane. At least two round tubular projections extend perpendicularly in different directions from the walls, each tubular projection being dimensioned internally to receive an end of a piece of PVC conduit. Circular openings extend through the walls concentric with each of the tubular projections, the openings being smaller than the internal dimensions of the projections to define a stop shoulder near the inner end of each tubular projection. The front edge of the box is formed with an outwardly sloping surface which is textured to encourage beading of moisture thereon. A cover for the box includes wall means defining a generally U-shaped channel, the channel following a path shaped to match the contour of the front edge of the side wall and opening in a direction opposite the open side of the box, and a body extending across the path of the channel for closing the open side of the box when the channel is placed over the outwardly sloping surface, the channel and outwardly sloping surface together forming a substantially water-excluding closure. Latch members protrude from the cover outwardly of the channel and latch sockets are formed on the box to receive the latch members outwardly of the sloping surface to retain the cover on the box.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein.

DESCRIPTION OF THE PREFERRED EMBODIMENTS

Figure 1:
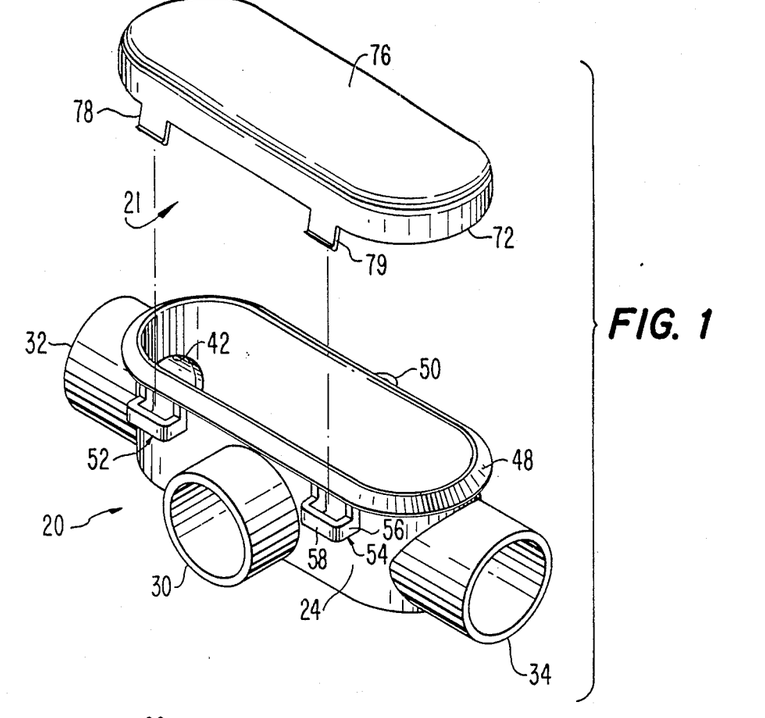
FIG. 1 is an exploded perspective view of a box and cover forming a housing in accordance with the present invention.
Figure 2:
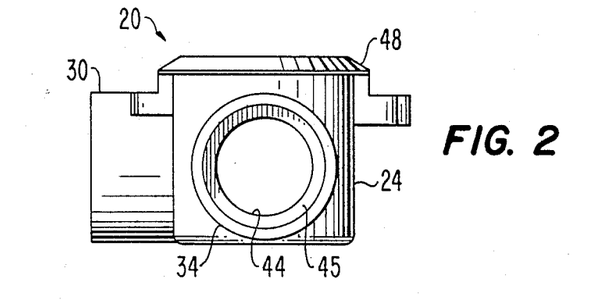
FIG. 2 is an end elevation of the box portion of the housing of FIG. 1.
Figure 3:
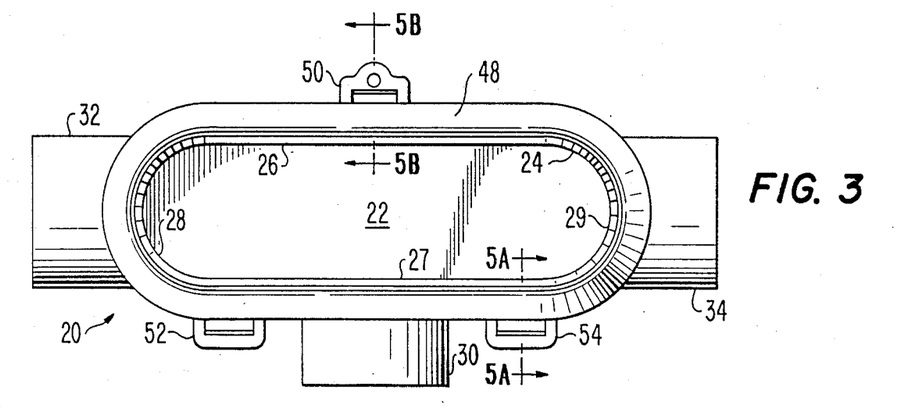
FIG. 3 is a top plan view of the box of FIG. 2.
Figure 4:
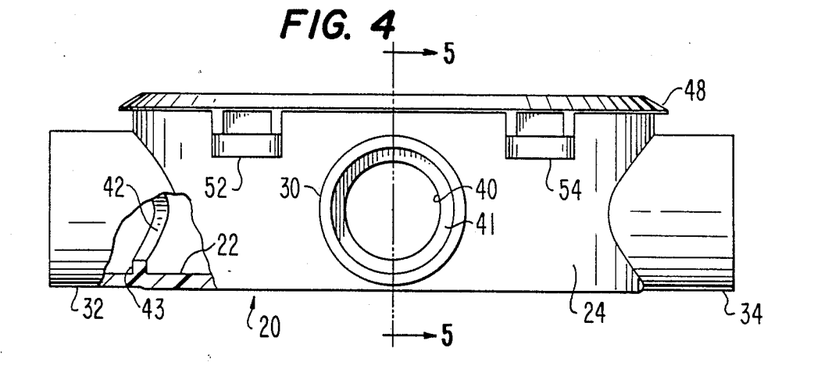
FIG. 4 is a side elevation of the box of FIGS. 2 and 3.

A first embodiment of a fitting in accordance with the present invention is shown in FIG. 1 and includes a main portion 20 in the form of a box having an open side, the box being provided with a cover indicated generally at 21. The box portion is further shown in FIGS. 2–5 and includes a back wall 22 and a substantially continuous side wall 24 which is unitarily formed with the back wall and forms a box with an open side or top to be closed by cover 21. Side wall, as best seen in FIG. 3, includes two generally parallel straight side wall sections 26 and 27 and two curved end wall sections 28 and 29 which interconnect the side wall sections, the lengths of the side wall sections being significantly greater than the spacing between them to form, with the end wall sections, an elongated chamber with curved ends. Preferably, the ratio of length to width of the volume defined by these wall sections is in the order of 4:1.

A plurality of tubular projections extend outwardly in different directions from the walls, the embodiment of FIG. 1 including tubular projections 30, 32 and 34. Each tubular projection has an internal diameter selected to receive the end of a section of tubular conduit as shown in dot-dash lines in FIG. 5 at 36. The conduit can be retained in its associated projection by an adhesive or a bonding agent or by a mechanical device. Such connection means is not part of the present invention.

Each wall which has a tubular projection extending outwardly therefrom is provided with a circular opening therethrough coaxially aligned with the tubular projection. Thus, the wall on which projection 30 is formed is provided with a circular opening 40, the wall from which projection 32 extends as an opening 42 which, viewed axially, is circular, and tubular projection 34 has an associated opening 44. Each of openings 40, 42 and 44 has a diameter which is slightly smaller than the inner diameter of its associated tubular projection and substantially equal to the inner diameter of a piece of solid conduit. Thus, the differences in diameter form stop shoulders 41, 43 and 45, respectively, against which the inner ends of sections of conduit can abut to define the insertion depth and also to provide a smooth, essentially uninterrupted passage for wires extending from the interiors of the conduits into the interior volume of the fitting.

The front or top edge of the side wall lies in a single plane and is provided with an outwardly sloping surface 48 which is textured to encourage beading of moisture thereon. The texturing is preferably formed by creating a textured surface in the mold used to produce the box and can be created, for example, by sand blasting or etching. As will be discussed further in connection with the cover, the outwardly sloping surface promotes the rejection or exclusion of water from the interior of the box, thereby making the housing usable in outdoor environmental conditions.

Figure 5:
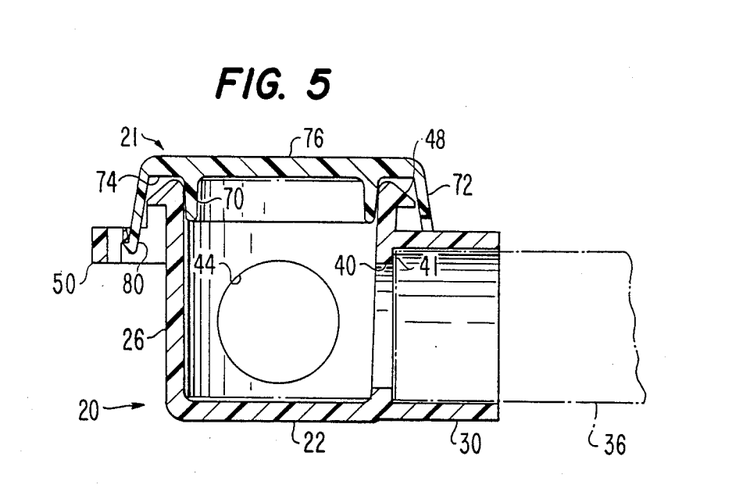
FIG. 5 is a transverse sectional view along line 5—5 of FIG. 4 with a sectional view of the cover of FIG. 1 added thereto.
Figure 5A:
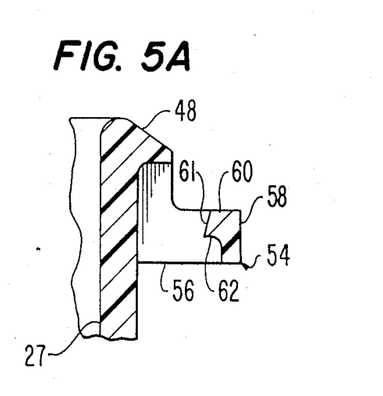
FIG. 5A is an enlarged fragmentary sectional view of a portion of a side wall of the box of FIGS. 1–5 showing one form of latch socket.

The box is provided with three latch sockets 50, 52 and 54, each latch socket being shaped to receive an L-shaped latch member connected to the lid 21 as will be described. As seen in FIGS. 1 and 3, each latch socket includes a generally U-shaped frame which surrounds a generally rectangular opening dimensioned to receive one of the latch members. The details of the latch sockets can be seen more clearly in FIGS. 5A and 5B in which latch sockets 54 and 50, respectively, are shown in enlarged sectional views. Referring first to FIG. 5A, it will be seen that the latch socket 54 includes outwardly extending arms 56 and a longitudinally extending portion 58 which is formed with an inwardly extending lip 60 having an inclined inwardly facing surface 61 and a downwardly facing shoulder 62. Surface 61 acts to cam the latch member inwardly when the cover is placed on the box and the shoulder formed by inwardly projecting lip 60 engages the latch member.

Figure 5B:
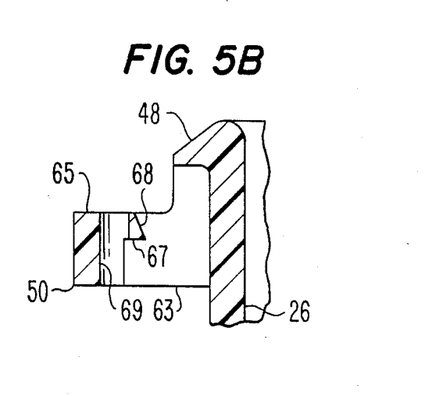
FIG. 5B is an enlarged fragmentary sectional view of another portion of a side wall of the box of FIGS. 1–5 showing a different form of latch socket.

Latch socket 50 is similar in having outwardly extending arms 63 supporting a longitudinally extending portion 65 which has an inwardly protruding lip 67 with an inclined inwardly facing surface 68 and a downwardly facing shoulder. Latch socket 50 differs from latch sockets 52 and 54 in having a thickened central portion with a vertically extending hole 69 which can be used to receive a screw to enhance the security of connecting the cover to the box, if desired.

Figure 6:
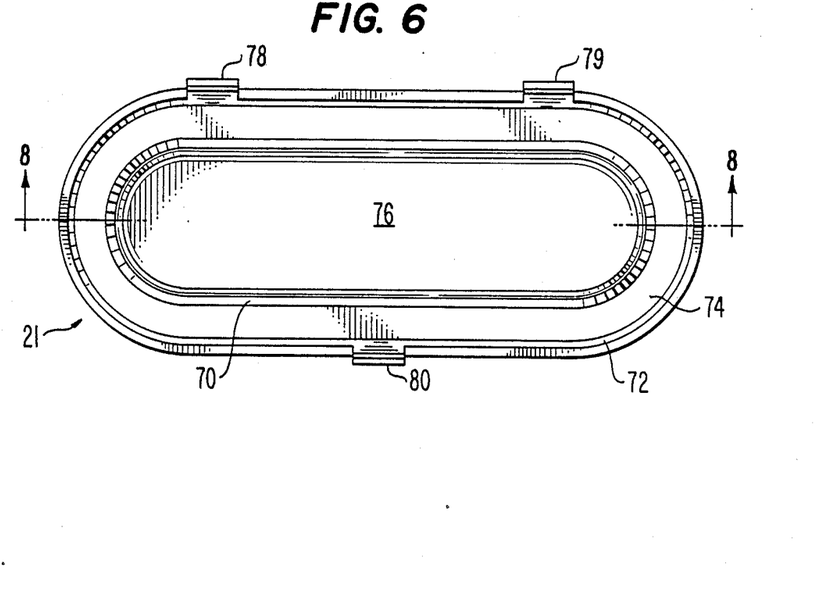
FIG. 6 is a bottom plan view of the cover of the housing assembly of FIG. 1.
Figure 7:
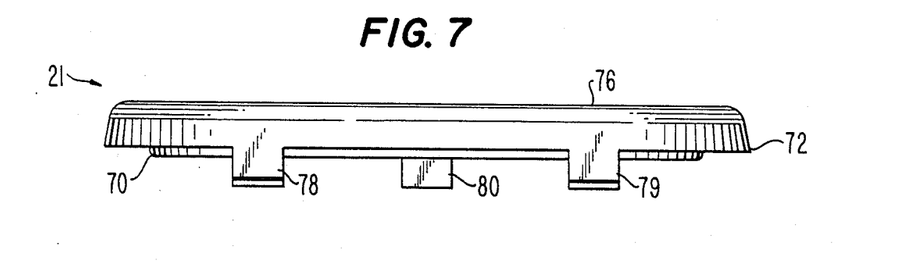
FIG. 7 is a side elevation of the cover of FIG. 6.
Figure 8:
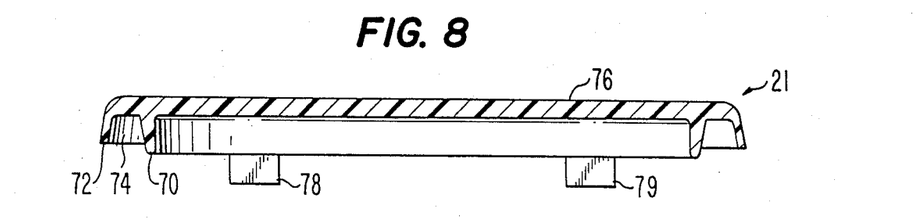
FIG. 8 is a longitudinal sectional view along line 8—8 of FIG. 6.

The cover is shown in FIGS. 6–8 and includes inner and outer skirt-like walls 70 and 72 defining a channel 74 therebetween. Channel 74 is generally U-shaped and, as seen in FIG. 6, follows an elongated path with straight sides and curved ends to match the contour of the front or top edge of the side wall. When joined together, the U-shaped channel opens downwardly when the interior of the box opens upwardly as shown in FIG. 5. A substantially continuous body 76 extends across and closes the area within the channel to close the open side of the box when the channel is placed over the outwardly sloping surface, body 76 being generally planar in the embodiment of FIGS. 1 and 6–8. As previously indicated, the channel cooperates with the outwardly sloping surface of the front or top edge of the box to form a water-excluding closure.

Latch members 78, 79 and 80 protrude downwardly from outer walls 72, as extensions or continuations of that wall, each latch member comprising an L-shaped tab with an outwardly extending end portion, as seen in FIG. 5. The outwardly extending end portion engages the inwardly extending lip of its associated latch socket when the cover is placed against the outwardly sloping surface 48 at the open side of the box. The three latches thus snap together when the cover is placed in position as illustrated in FIG. 5, holding the cover securely in place.

To remove the cover, it is only necessary to place the end of an implement such as a conventional flatbladed screw driver against the outer surface of latch member 80, pressing inwardly until the outwardly extending end portion of the latch member disengages the shoulder of the inwardly extending lip of latch socket 50, allowing the latch member to move upwardly and out of the socket. The cover can then be swung away from the open side of the box, releasing the latches on the other side.

It will be observed, as shown in FIG. 5, that the inner surface of the U-shaped channel 74 of the cover encompasses surface 48 of the box leaving a rather sizable space therebetween. This space forms a drainage path for water to run to the lowest point of the housing assembly, almost without regard to its mounting orientation, so that the water can drain out of the region between the box and cover. The components are designed to avoid a tight fit in which the interior conformation of the cover matches that of the box. It has been found that such relationships tend to induce the flow of water from outside of the box to the interior thereof by a form of capillary action. By providing the drainage channel described above, along with a relatively loose fit between the box and cover, water is drained away from the interior and there is no tendency to induce flow into the interior of the housing.

Figure 9:
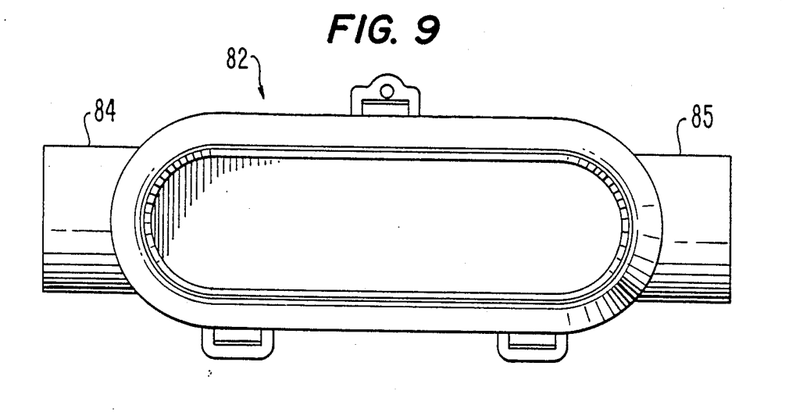
FIGS. 9, 10 and 11 are top plan views of further embodiments of boxes usable in the manner of FIG. 1.
Figure 10:
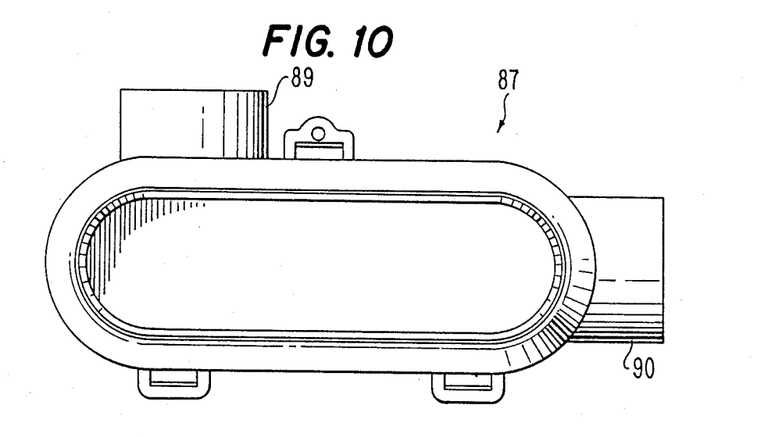
Figure 11:
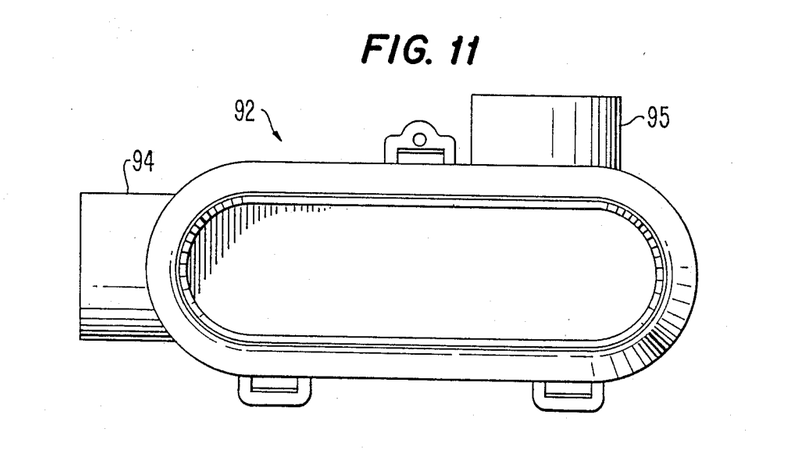

FIGS. 9, 10 and 11 illustrate other configurations of boxes in accordance with the present invention, these boxes differing from that shown in FIGS. 1–5 only in the arrangement of the tubular projections which form conduit-receiving sockets. Thus, box 82 in FIG. 9 has tubular projections 84 and 85 extending from opposite ends thereof to interconnect two pieces of conduit which are coaxially aligned with each other. Box 87 shown in FIG. 10 has tubular projections 89 and 90, projection 89 extending from one of the straight side sections near one end thereof and projection 90 extending from a curved end section as in FIGS. 1 and 9. The box of FIG. 10 is particularly useful in making L-shaped interconnections of conduit sections.

Similarly, FIG. 11 shows a box 92 having tubular projections 94 and 95 which are oriented at the straight and curved portions of the box to form L connections with a reverse orientation from that of FIG. 10.

Figure 12:
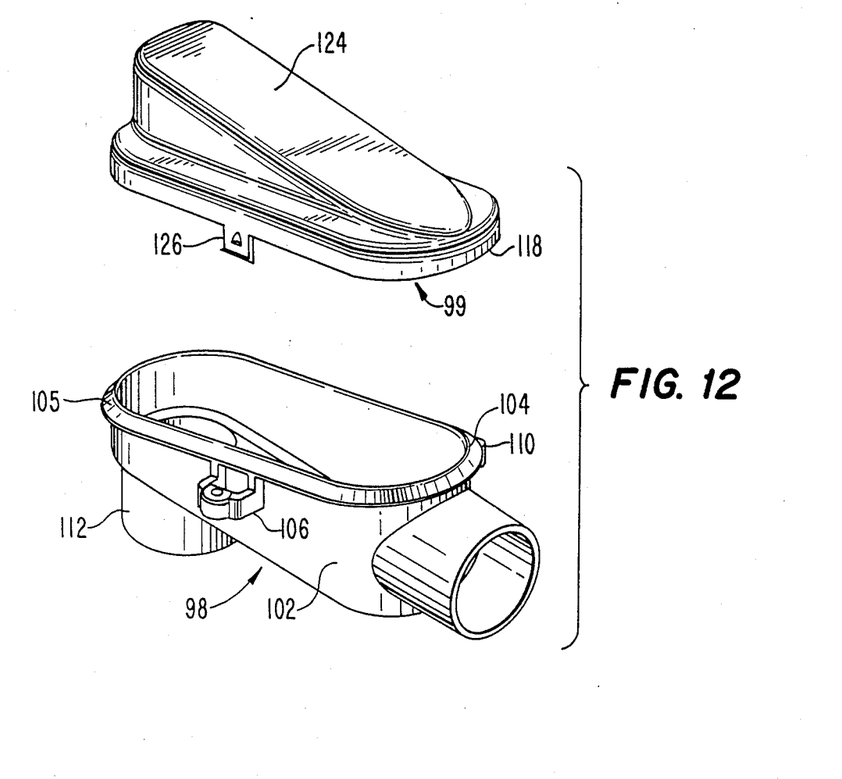
FIG. 12 is an exploded perspective view of a further embodiment of a housing assembly in accordance with the invention.
Figure 13:
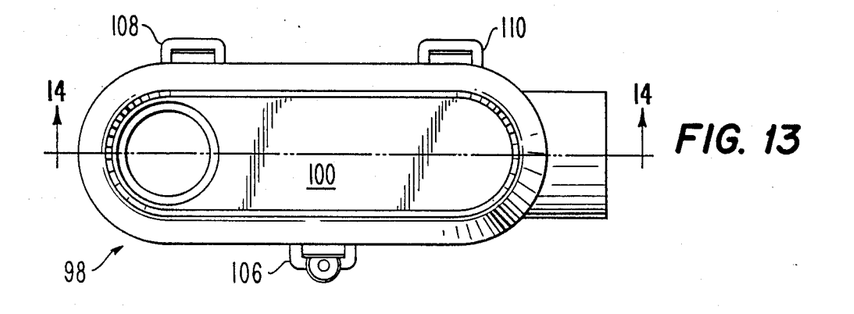
FIG. 13 is a top plan view of the box portion of the housing assembly of FIG. 12.
Figure 14:
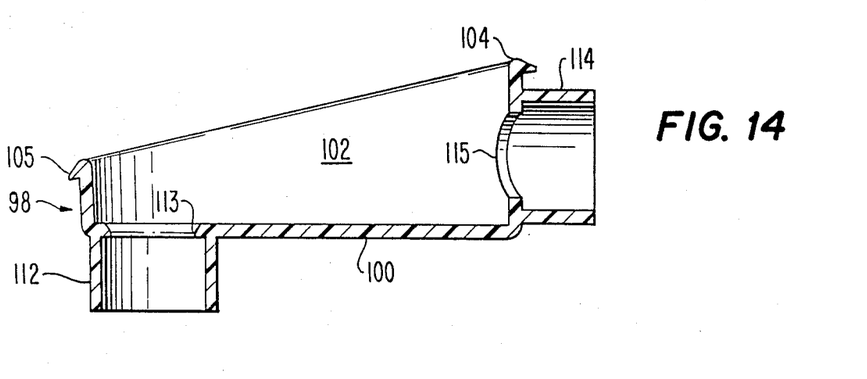
FIG. 14 is a longitudinal sectional view along line 14—14 of FIG. 13.

FIGS. 12-15 show a somewhat different arrangement of a box and cover forming a wiring housing, the most apparent differences being that the plane containing the top edge of the box is not parallel with the back wall of the box and that the cover is formed so as to define a significant wire-containing volume. As shown in FIG. 12, this embodiment includes a box 98 and a cover 99. Box 98, as shown in FIGS. 12, 13 and 14, includes a back wall 100, a curved side wall 102 having straight, parallel side portions and curved end portions and a front or top edge 104 having an outwardly sloping textured surface 105 as in the embodiments of FIGS. 1-11. However, unlike those embodiments, edge 104 lies in a plane which makes an angle about 15° with the plane containing back wall 100, this angle preferably being between about 10° and about 20°.

Body 98 is provided with latch sockets 106, 108 and 110 which are formed in a manner substantially identical to the previously described embodiments. A tubular projection 112 extends from back wall 100 near the shallower end of the box and a tubular projection 114 extends from an end wall of the box near the deeper end thereof in a manner similar to projection 32 in the embodiment of FIG. 1.

Back wall 100 has a circular opening 113 which is coaxially aligned with projection 112 and the end wall section from which projection 114 extends has a circular opening 115 aligned therewith, openings 113 and 115 being smaller than the inner diameters of their associated projections to form stop shoulders for conduit inserted therein, as previously described.

Figure 15:
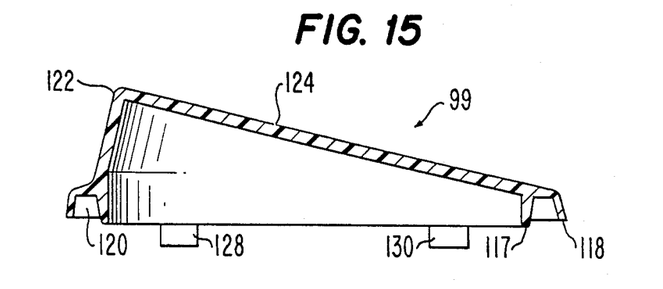
FIG. 15 is a longitudinal section through the cover portion of the housing assembly of FIG. 12.

The cover 99 is formed with inner and outer walls 117 and 118, respectively, forming therebetween a generally U-shaped channel 120 which functions in a manner similar to channel 74 on cover 21. However, the body portion 122 thereof which extends across and closes the space within the path followed by channel 120 does not lie in a single plane as did body 76 but, rather, is recessed so that the major outer wall 124 thereof is generally parallel with back wall 100 when the cover is assembled on the box. Thus, the resulting volume enclosed by the box and cover when assembled is substantially the same as the assembly of FIGS. 1-11, assuming similar length, width and depth measurements, but when cover 99 is removed from box 98 the wires extending into the box are more exposed and are more readily accessible.

Cover 99 is provided with latch members 126, 128 and 130 which are formed substantially like latch members 80, 78 and 79 on the cover 21 and function in a similar fashion, mating with, respectively, latch sockets 106, 108 and 110.

Because of the fact that the embodiment of FIGS. 12-15 has tubular projections at one end and the back wall near the opposite end, the cover opens to the outside of the L-junction formed by conduits connected thereto rather than the opening being a lateral one as with the embodiments of FIGS. 10 and 11. In addition, as previously indicated, because of the sloping surface containing the front edge of the box and the U-shaped channel of the cover, with respect to back wall 100, improved access to the wiring is achieved.

In all embodiments, the edges of the conduit stops and body portions are rounded to prevent damage to the wire and insulation during installation.

Figure 16:
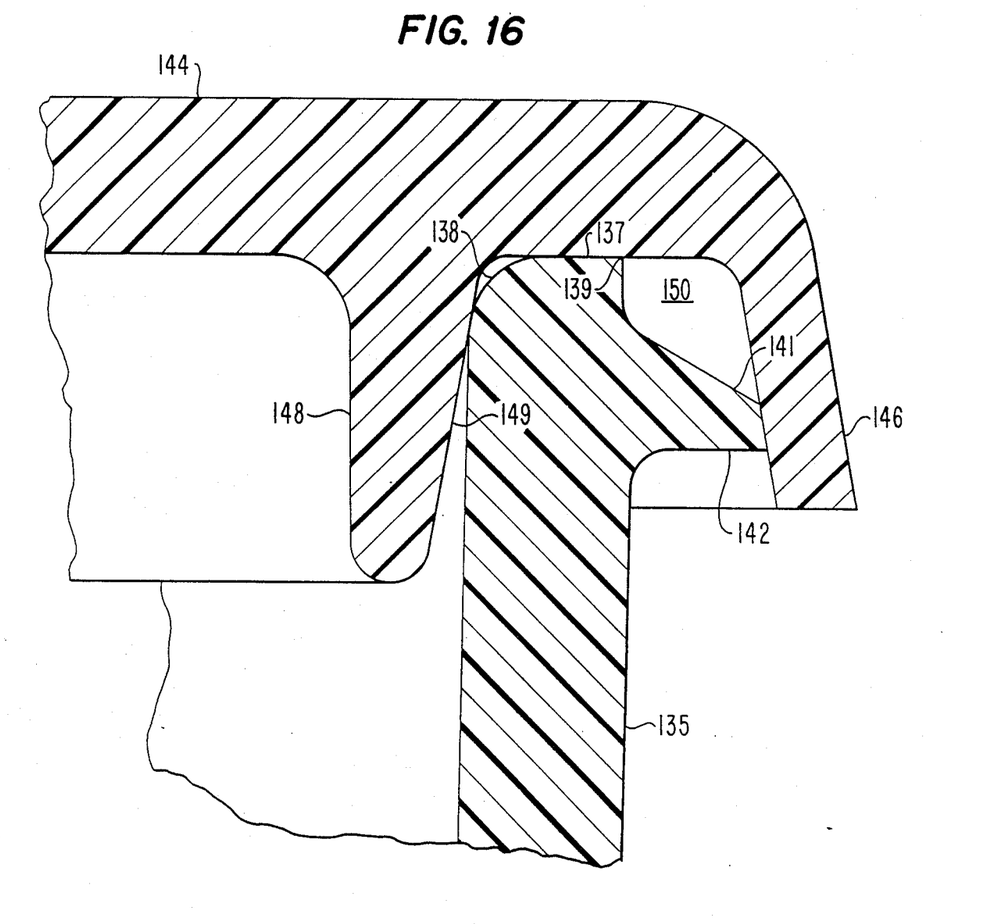
FIG. 16 is an enlarged partial sectional view of the side wall and cover of a further embodiment of the invention having improved strength and water rejection features.

A further embodiment of the wall and cover structure is shown in the sectional view of FIG. 16 wherein the upper portion of one side wall 135 of the box is shown. At the upper edge of wall 135, the inner surface of the wall smoothly curves into a flat upper surface 137 which forms a sharp corner at 139 with the outer surface of the wall. The smoothly curved surface at 138 avoids the possibility of abrading wires which may rub across the upper edge of the wall during installation. From corner 139, the outer surface of the wall extends downwardly, essentially parallel with the inner surface, for a short distance and then curves outwardly to form a flange projection 141 having an under surface 142 which is substantially perpendicular with wall 135. The distal edge of flange 141 is substantially flat and lies at a suitable angle to receive the cover.

The cover 144 has an outer skirt 146, the inner surface of which abuts the end of flange 141. An inner wall 148 is spaced inwardly from skirt 146 and has an inner surface which is essentially perpendicular with the outer surface of the cover and an outer surface 149 which lies at an angle of approximately 10 with the major surface of the cover, this angle helping to act as a guide when the cover is installed and to increase the allowable camber for the molded parts. The lower edge of wall 148 is rounded to reduce the possibility of wire abrasion when the cover is installed.

The angle of surface 149 also increases the clearance between the inner wall of the cover and the inner surface of wall 135 to prevent capillary action from occurring between those surfaces. Wall 148 is longer than the outer skirt 146 to cause a damming effect for the purpose of preventing water entry when the fitting is installed upside down, i.e., with the cover as the lowest part of the assembly.

The provision of flat surface 137 and a sharp corner at 139 considerably increases the crush resistance of the body. It is necessary for a box of this type to survive certain tests set forth by Underwriters Laboratory in order to be acceptable under codes in various jurisdictions. Among these tests is a crush test to determine the level of force at which wall 135 might buckle. With surface 137 and corner 139 as shown, it as been found, somewhat surprisingly, that the crush resistance is greatly increased, apparently reducing the primary bending moment which might cause the wall to buckle during the crush loading.

It will also be observed that a rather large channel or gutter 150 is formed between projection 141, the upper end of wall 135 and the inner surface of the cover at the root of skirt 146. This gutter is used to carry water which gets past projection 141 and which might be drawn into the cover by capillary action at the latches. The water is carried to the lowest end of the fitting where it drains through clearance between the cover and body. Skirt 146 acts as an umbrella and drip rail when the fitting is installed in a horizontal position. When it is installed with its side walls horizontal, the projection 141 acts as a water dam. Finally, the use of textured finish on the exterior of both parts and on some areas of the interlocking interface aids in reducing the surface adhesion which further reduces the effect of capillary action.

Figure 17:
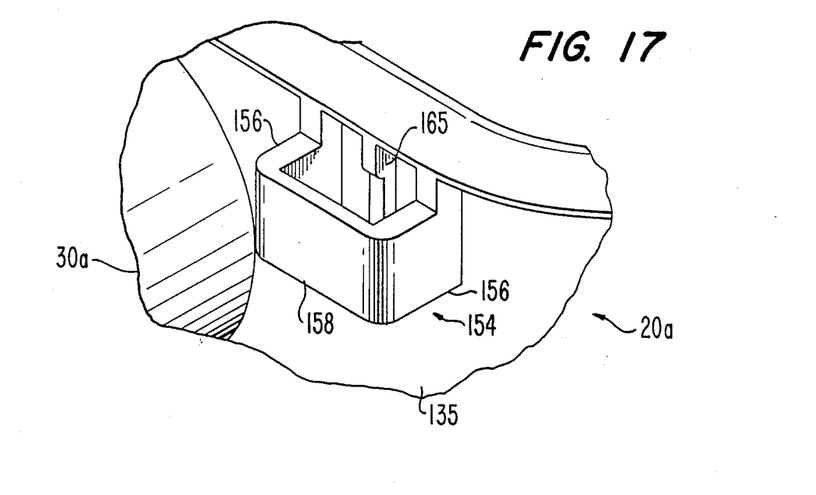
FIG. 17 is a partial perspective view of a further embodiment of a latch structure.
Figure 18:
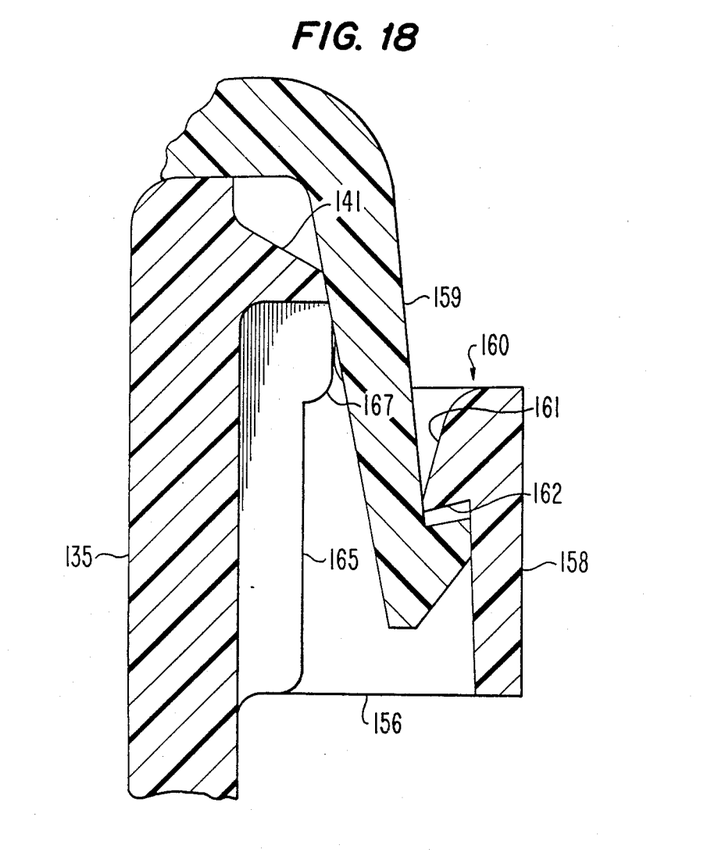
FIG. 18 is a partial sectional view of the latch structure of FIG. 17.

FIGS. 17 and 18 illustrate an improved latch structure which is shown in the context of a box 20 as shown in FIG. 1. The partial view of FIG. 17 shows box 20a having a side wall 24a with a tubular projection 30a extending from one side thereof. A latch socket 154 is formed on the side of the box and is shaped to receive an L-shaped latch member 159 as shown in FIG. 18, like that described in connection with FIG. 1. Latch socket 154 includes outwardly extending arms 156 and a longitudinally extending portion 158 having an inwardly extending lip 160. Lip 160 has an inclined inwardly facing surface 161 and a downwardly facing shoulder 162. Surface 161 has a smoothly curved upper portion to more effectively cam the end of hook 159 inwardly when the cover is assembled on the box.

In addition, the outer surface of wall 24a is formed with a rib 165 having a portion 167 at the upper end thereof which is flush with the outer end of projection 141. The lower portion of the rib acts as a stop to prevent the latch tab from being bent inwardly too far and over-stressing the tab in repeated removals and reinstallations.

Surface 162 forms an angle of less than 90° with the inner surface of wall 158 causing the lip to firmly hook the latch when the cover is pulled straight up, preventing removal thereof. The angular relationship between the hooking portions also insures that loads during pull-off are applied to the strongest area of the cover tabs. The shape of surface 161 is also such that a V-shaped opening exists between the tab and surface 161 to permit the insertion of a screwdriver blade which can be used as a lever to release the latch. The combination of these latch features creates a snap-together fitting which is easy to assembly but requires a common hand tool to open.

While certain advantageous embodiments have been chosen to illustrate the invention, it will be understood by those skilled in the art that various changes and modifications can be made therein without departing from the scope of the invention as defined in the appended claims.

What is claimed is:

1. A wiring housing for interconnecting non-metallic electrical conduit comprising the combination of
   a main portion including a back wall and a substantially continuous side wall forming a box with an open front, said side wall having a front edge lying in a single plane;
   at least two round tubular projections extending substantially perpendicularly in different directions from said walls, each said tubular projection being dimensioned internally to receive an end of a piece of non-metallic conduit;
   means in said walls defining generally circular openings through said walls concentric with each of said tubular projections, said openings being smaller than the internal dimensions of said projections to define a stop shoulder at the inner end of each said tubular projection;
   means forming an outwardly sloping surface adjacent said front edge, said surface being textured to encourage beading of moisture thereon;
   a cover comprising
   wall means defining a generally U-shaped channel, said channel following a path shaped to match the contour of said front edge of said side wall with said U-shaped channel opening in a direction opposite the open side of said box, and
   a substantially continuous body within said path followed by said channel for closing said open side of said box when said channel is placed over said outwardly sloping surface, said channel and said outwardly sloping surface forming a substantially water-excluding closure;
   a plurality of latch members protruding from said cover outwardly of said channel; and
   a plurality of latch sockets shaped to receive said latch members formed on said wall outwardly of said outwardly sloping surface to retain said cover on said housing.

2. A housing according to claim 1 wherein said side wall forms two generally parallel, straight side wall sections and two curved end wall sections interconnecting said side wall sections, the lengths of said side wall sections being significantly greater than the spacing between said side wall sections to form therein an elongated chamber with curved ends.

3. A housing according to claim 2 wherein said plane containing said front edge of said side wall is substantially parallel with said back wall.

4. A housing according to claim 3 and including tubular projections extending from both of said curved end wall sections.

5. A housing according to claim 4 and further including a tubular projection extending from one of said straight wall sections.

6. A housing according to claim 3 and including a tubular projection extending from one of said curved wall sections and one of said straight wall sections.

7. A housing according to claim 6 wherein each said latch member is an L-shaped tab with an outwardly extending end portion and each said latch socket includes a frame surrounding a rectangular opening dimensioned to receive said outwardly extending end portion of said tab, said frame including means defining an inwardly facing lip to engage said end portion of said tab when said cover is placed against said front edge of said side wall.

8. A housing according to claim 7 wherein said plane containing said front edge of said side wall makes an angle of between about 10 degrees and about 20 degrees with the plane containing said back wall.

9. A housing according to claim 8 and including tubular projections extending from said back wall and from one of said curved wall sections adjacent opposite ends of said housing.

10. A housing according to claim 9 wherein said body within said path followed by said channel includes a generally planar portion making an angle of between about 10 degrees and about 20 degrees with a plane containing said channel.

11. A housing according to claim 7 and further comprising a rib formed on an outer surface of said side wall within said frame, said rib forming a stop member to limit flexing of said L-shaped tab during removal of said cover.

12. A housing according to claim 1 wherein the outer periphery of said front edge forms a sharp, substantially 90° corner with the outer surface of said side wall, said outwardly sloping surface including a curved portion merging smoothly into said side wall toward said corner.

* * * * *